US008190141B2

(12) United States Patent
Krause et al.

(10) Patent No.: US 8,190,141 B2
(45) Date of Patent: May 29, 2012

(54) METHOD FOR REACTIVATING A THEN-CURRENTLY DEACTIVATED MOBILE UNIT

(75) Inventors: Kevin R. Krause, Plymouth, MI (US); Steven P. Schwinke, Plymouth, MI (US)

(73) Assignee: General Motors LLC, Detroit, MI (US)

( * ) Notice: Subject to any disclaimer, the term of this patent is extended or adjusted under 35 U.S.C. 154(b) by 219 days.

(21) Appl. No.: 12/755,974

(22) Filed: Apr. 7, 2010

(65) Prior Publication Data

US 2011/0250877 A1 Oct. 13, 2011

(51) Int. Cl.
 *H04M 3/00* (2006.01)
(52) U.S. Cl. ......... 455/419; 455/411; 455/418; 455/466
(58) Field of Classification Search ........................ None
 See application file for complete search history.

(56) References Cited

U.S. PATENT DOCUMENTS

| | | | |
|---|---|---|---|
| 5,794,142 A * | 8/1998 | Vanttila et al. | 455/419 |
| 6,151,497 A | 11/2000 | Yee et al. | |
| 6,301,484 B1 | 10/2001 | Rogers et al. | |
| 6,741,872 B1 * | 5/2004 | Pinault | 455/564 |
| 6,915,126 B2 | 7/2005 | Mazzara, Jr. | |
| 7,292,848 B2 | 11/2007 | Mazzara, Jr. et al. | |
| 7,398,082 B2 | 7/2008 | Schwinke et al. | |
| 7,532,859 B2 | 5/2009 | Videtich | |
| 7,873,345 B1 * | 1/2011 | Dunne et al. | 455/404.1 |
| 7,894,795 B1 * | 2/2011 | Dunne et al. | 455/406 |
| 2003/0139173 A1 | 7/2003 | Mazzara, Jr. et al. | |
| 2003/0211854 A1 | 11/2003 | Mazzara, Jr. | |
| 2004/0012501 A1 | 1/2004 | Mazzara et al. | |
| 2004/0023647 A1 | 2/2004 | Mazzara, Jr. et al. | |
| 2006/0046649 A1 | 3/2006 | Videtich | |
| 2006/0052092 A1 | 3/2006 | Schwinke et al. | |
| 2007/0244628 A1 | 10/2007 | Rockett et al. | |
| 2009/0191872 A1 * | 7/2009 | Chatterjee et al. | 455/435.1 |

* cited by examiner

*Primary Examiner* — Rafael Pérez-Gutiérrez
*Assistant Examiner* — German Viana Di Prisco
(74) *Attorney, Agent, or Firm* — Dierker & Associates, P.C.

(57) ABSTRACT

A method for reactivating a then-currently deactivated mobile unit involves submitting a request to a call center to reactivate the mobile unit and, upon receiving the request, submitting another request to a cellular service provider from the call center, where such other request includes a request to broadcast a message having a mobile unit identifier and a reactivation protocol contained therein. The method further involves broadcasting the message from the cellular service provider to a plurality of mobile units each having an identical inactive dialing number stored therein. A processor operatively associated with the then-currently deactivated mobile unit recognizes the mobile unit identifier contained in the broadcasted message. Upon recognizing the mobile unit identifier, the processor applies the reactivation protocol contained in the broadcasted message to initiate reactivation of the then-currently deactivated mobile unit.

20 Claims, 2 Drawing Sheets

METHOD FOR REACTIVATING A THEN-CURRENTLY DEACTIVATED MOBILE UNIT

TECHNICAL FIELD

The present disclosure relates generally to methods for reactivating a then-currently deactivated mobile unit.

BACKGROUND

Activated mobile units are generally associated with an activation number (such as, e.g., a mobile dialing number (MDN), phone number, or the like), which enables the mobile unit to receive incoming calls. In many cases, this activation number is removed once the mobile unit is deactivated, and such number is replaced with an inactive dialing number. The mobile unit generally remains deactivated with the inactive dialing number until such unit is reactivated.

SUMMARY

A method for reactivating a then-currently deactivated mobile unit is disclosed herein. The method involves submitting a request to a call center to reactivate the mobile unit and, upon receiving the request, submitting another request to a cellular service provider from the call center. The other request includes a request to broadcast a message having a mobile unit identifier and a reactivation protocol contained therein. The message is broadcast from the cellular service provider to a plurality of mobile units each having an identical inactive dialing number stored therein. A processor associated with the then-currently deactivated mobile unit recognizes the mobile unit identifier contained in the broadcasted message and, upon such recognition, applies the reactivation protocol contained in the broadcasted message to initiate reactivation of the then-currently deactivated mobile unit.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Example(s) of the method as disclosed herein may advantageously be used to reactivate a then-currently deactivated mobile unit (e.g., a telematics unit), where the actual reactivation process is accomplished without the user and/or call center advisor(s) being directly involved. Such may be accomplished by utilizing broadcast messaging technology to target the deactivated mobile unit, and to provide a reactivation procedure directly to the targeted mobile unit. As part of the reactivation procedure, a message is transmitted to a plurality of vehicles having a shared or common (i.e., "dummy") mobile dialing number (MDN). A shared/common mobile dialing number is recognizable by a wireless/cellular carrier provider, but the electronic serial number (ESN) associated with such a dialing number is a placeholder or wildcard that does not identify any one particular device. When a mobile unit is deactivated, the shared/common mobile dialing number enables such units to receive messages (e.g., from the call center or another party via a cellular service provider). The method disclosed herein utilizes such shared/common mobile dialing numbers to transmit a message, which is targeted for a specific vehicle, to a plurality of vehicles. The targeted vehicle alone will be able to process the message and reactivate itself based upon protocol contained in the message. Upon reactivation of the device, the shared/common MDN is replaced with an active MDN, which enables the device to make and receive calls. The method is also advantageously efficient at least for purposes of reactivating deactivated units, and the reactivation portion of such method requires less or no work on behalf of the user and/or call center advisor(s) (e.g., a user does not have to sit on the phone during reactivation).

It is to be understood that, as used herein, the term "user" includes a vehicle owner, operator, and/or passenger. It is further to be understood that the term "user" may be used interchangeably with the term subscriber/service subscriber/vehicle owner.

Additionally, the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Also, the term "communication" is to be construed to include all forms of communication, including direct and indirect communication. As such, indirect communication may include communication between two components with additional component(s) located therebetween.

As used herein, a "deactivated mobile unit", "deactivated mobile communications device" or a "deactivated telematics unit" is a mobile unit or telematics unit that cannot provide services because a subscription with a service provider (e.g., a cellular service provider or a call center which provides telematics services) has never been started, has expired, or has been canceled. A deactivated mobile unit or telematics unit generally has stored therein an "inactive dialing number" (the previously mentioned common/shared or "dummy" number), which is a number that acts as a place holder until an active MDN is stored in the unit upon activation/reactivation. It is to be understood that when the mobile unit is activated, it has stored therein a unique MDN that enables the unit to receive incoming calls and place outgoing calls. However, when the mobile unit is deactivated, the active MDN is replaced with the "dummy" number (usually in a single number replacement operation), where such "dummy" number may be shared with one or more other deactivated units. It is to be understood that such "dummy" number is loaded into the deactivated device prior to sending a broadcasted reactivation message thereto. Examples of the method for sending the broadcasted reactivation message to the deactivated device will be described in further detail below.

Figure 1:
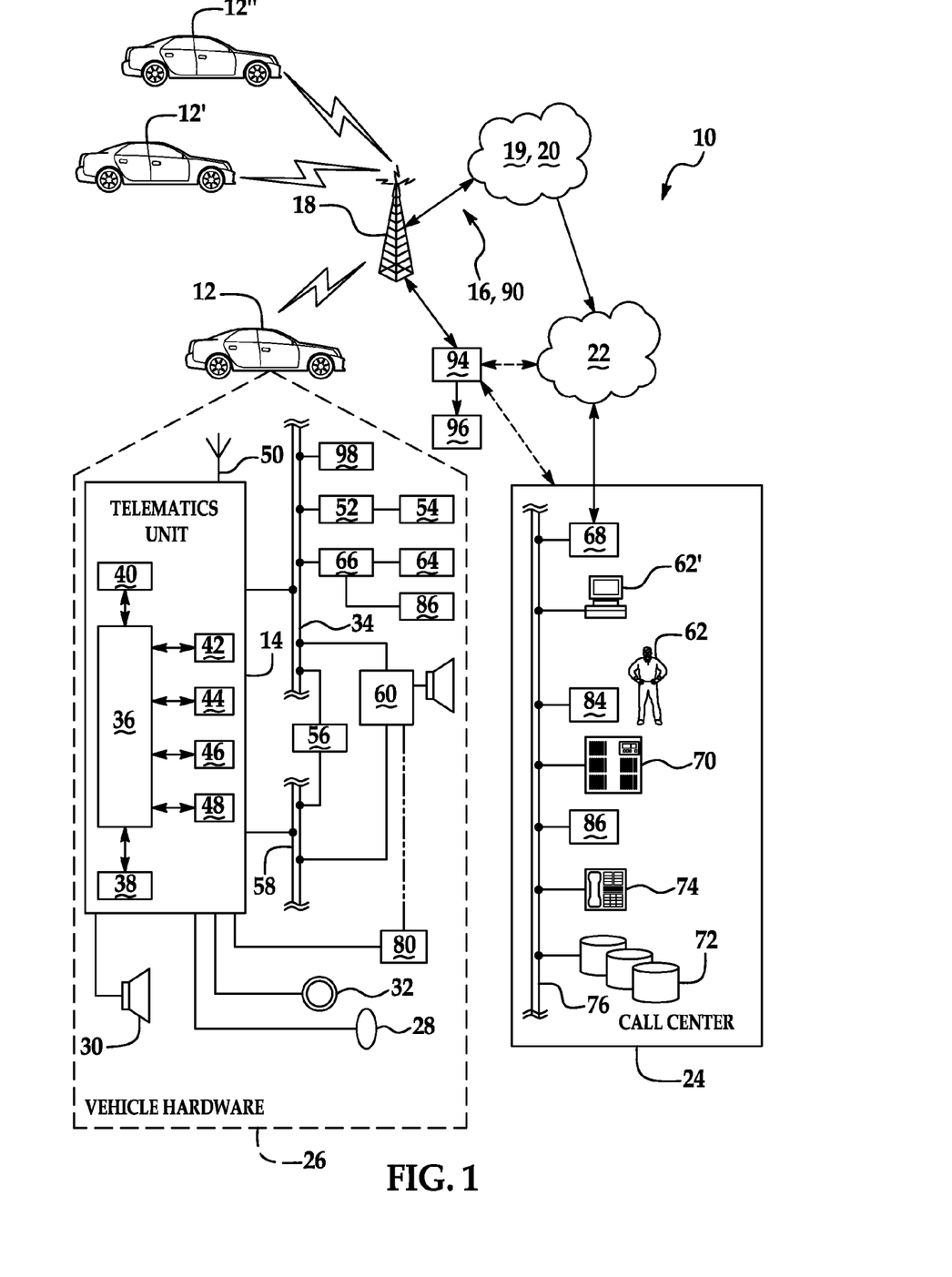
FIG. 1 is a schematic diagram depicting an example of a system for reactivating a then-currently deactivated mobile unit.

FIG. 1 described in detail below depicts a system (identified by reference character 10) for reactivating a deactivated telematics unit (identified by reference character 14). It is to be understood that the system 10 depicted in FIG. 1 is provided herein for purposes of illustrating one example of the instant disclosure. It is further to be understood that the examples of the method may also be used to reactivate any suitable mobile device, not limited to a telematics unit. Non-limiting examples of other devices include a cellular phone, a PDA, a personal computer having two-way communication capabilities, and/or the like, and/or combinations thereof. Such devices may be used in a mobile vehicle (such as the vehicle 12 shown in FIG. 1) or outside of a vehicle, and may be configured to provide services according to a subscription agreement with, e.g., a call center (identified by reference character 24 in FIG. 1).

Referring now to FIG. 1, in an example, a system 10 for reactivating a then-currently deactivated mobile unit (e.g., telematics unit 14) includes a plurality of vehicles (three vehicles 12, 12', 12" shown in FIG. 1), where each vehicle 12, 12', 12" includes a respective telematics unit (such as the telematics unit 14 associated with the vehicle 12). The system also includes a carrier/communication system 16 (including, but not limited to, one or more cell towers 18, one or more base stations 19 and/or mobile switching centers (MSCs) 20, and one or more service providers (not shown)), one or more land networks 22, and one or more call centers 24. In an example, the carrier/communication system 16 is a two-way radio frequency communication system, and may be configured with a web service supporting system-to-system communications (e.g., communications between the call center 24 and the service provider 90), as well as a front-end graphic user interface (GUI) that a user may interact with (e.g., a webpage). For the latter instance, the carrier/communication system 16 would also include a host server 94 including suitable computer equipment (not shown) upon which information of a remotely accessible page 96 (e.g., the webpage) resides/is stored. More specifically, the remotely accessible page 96 is a webpage set up and maintained by a network provider 90 or by a call center 24, and the user may access such page by, e.g., submitting an appropriate login and password.

The overall architecture, setup and operation, as well as many of the individual components of the system 10 shown in FIG. 1 are generally known in the art. Thus, the following paragraphs provide a brief overview of one example of such a system 10. It is to be understood, however, that additional components and/or other systems not shown here could employ the method(s) disclosed herein.

Vehicle 12 is a mobile vehicle such as a motorcycle, car, truck, recreational vehicle (RV), boat, plane, etc., and is equipped with suitable hardware and software that enables it to communicate (e.g., transmit and/or receive voice and data communications) over the carrier/communication system 16. It is to be understood that the vehicle 12 may also include additional components suitable for use in the telematics unit 14.

Some of the vehicle hardware 26 is shown generally in FIG. 1, including the telematics unit 14 and other components that are operatively connected to the telematics unit 14. Examples of such other hardware 26 components include a microphone 28, a speaker 30 and buttons, knobs, switches, keyboards, and/or controls 32. Generally, these hardware 26 components enable a user to communicate with the telematics unit 14 and any other system 10 components in communication with the telematics unit 14.

Operatively coupled to the telematics unit 14 is a network connection or vehicle bus 34. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few. The vehicle bus 34 enables the vehicle 12 to send and receive signals from the telematics unit 14 to various units of equipment and systems both outside the vehicle 12 and within the vehicle 12 to perform various functions, such as unlocking a door, executing personal comfort settings, and/or the like.

The telematics unit 14 is an onboard device that provides a variety of services, both individually and through its communication with the call (or data) center 24. The telematics unit 14 generally includes an electronic processing device 36 operatively coupled to one or more types of electronic memory 38, a cellular chipset/component 40, a wireless modem 42, a navigation unit containing a location detection (e.g., global positioning system (GPS)) chipset/component 44, a real-time clock (RTC) 46, a short-range wireless communication network 48 (e.g., a BLUETOOTH® unit), and/or a dual antenna 50. In one example, the wireless modem 42 includes a computer program and/or set of software routines executing within processing device 36.

It is to be understood that the telematics unit 14 may be implemented without one or more of the above listed components, such as, for example, the short-range wireless communication network 48. It is to be further understood that telematics unit 14 may also include additional components and functionality as desired for a particular end use.

The electronic processing device 36 may be a micro controller, a controller, a microprocessor, a host processor, and/or a vehicle communications processor. In another example, electronic processing device 36 may be an application specific integrated circuit (ASIC). Alternatively, electronic processing device 36 may be a processor working in conjunction with a central processing unit (CPU) performing the function of a general-purpose processor. In a non-limiting example, the electronic processing device 36 (also referred to herein as a processor) includes software programs having computer readable code (embodied in/on a computer readable medium) to initiate and/or perform one or more steps of the method disclosed herein. For instance, the software programs may include computer readable code for recognizing a mobile unit identifier contained in a message broadcasted to the telematics unit 14 and computer readable code for applying a reactivation protocol contained in the broadcasted message to initiate reactivation of the device.

The location detection chipset/component 44 may include a Global Position System (GPS) receiver, a radio triangulation system, a dead reckoning position system, and/or combinations thereof In particular, a GPS receiver provides accurate time and latitude and longitude coordinates of the vehicle 12 responsive to a GPS broadcast signal received from a GPS satellite constellation (not shown).

The cellular chipset/component 40 may be an analog, digital, dual-mode, dual-band, multi-mode and/or multi-band cellular phone. The cellular chipset-component 40 uses one or more prescribed frequencies in the 800 MHz analog band or in the 800 MHz, 900 MHz, 1900 MHz and higher digital cellular bands. Any suitable protocol may be used, including digital transmission technologies such as TDMA (time division multiple access), CDMA (code division multiple access) and GSM (global system for mobile telecommunications). In some instances, the protocol may be short-range wireless communication technologies, such as BLUETOOTH®, dedicated short-range communications (DSRC), or Wi-Fi.

Also associated with electronic processing device 36 is the previously mentioned real time clock (RTC) 46, which provides accurate date and time information to the telematics unit 14 hardware and software components that may require and/or request such date and time information. In an example, the RTC 46 may provide date and time information periodically, such as, for example, every ten milliseconds.

The telematics unit 14 may include a vehicle data upload (VDU) system (not shown), which is configured to receive raw vehicle data from the bus 34, packetize the data, and upload the packetized raw data to the call center 24 (or other external entity). In one example, the VDU is operatively connected to the processor 36 of the telematics unit 14, and thus is in communication with the call center 24 via the bus 34 and the carrier/communication system 16. In another example, the VDU may be the telematics unit's central data system that can include a modem, a processor, and an on-board database. The database can be implemented using a separate network attached storage (NAS) device or be located elsewhere, such as in memory 38, as desired. The VDU system has an application program that handles all of the vehicle data upload processing, including communication with the call center 24 and the setting and processing of triggers which initiate a data upload event.

The telematics unit 14 provides numerous services, some of which may not be listed herein, and is configured to fulfill one or more user or subscriber requests. Several examples of such services include, but are not limited to: turn-by-turn directions and other navigation-related services provided in conjunction with the GPS based chipset/component 44; airbag deployment notification and other emergency or roadside assistance-related services provided in connection with various crash and or collision sensor interface modules 52 and sensors 54 located throughout the vehicle 12; and infotainment-related services where music, Web pages, movies, television programs, videogames and/or other content is downloaded by an infotainment center 56 operatively connected to the telematics unit 14 via vehicle bus 34 and audio bus 58. In one non-limiting example, downloaded content is stored (e.g., in memory 38) for current or later playback.

Again, the above-listed services are by no means an exhaustive list of all the capabilities of telematics unit 14, but are simply an illustration of some of the services that the telematics unit 14 is capable of offering.

Vehicle communications generally utilize radio transmissions to establish a voice channel with carrier system 16 such that both voice and data transmissions may be sent and received over the voice channel. Vehicle communications are enabled via the cellular chipset/component 40 for voice communications and the wireless modem 42 for data transmission. In order to enable successful data transmission over the voice channel, wireless modem 42 applies some type of encoding or modulation to convert the digital data so that it can communicate through a vocoder or speech codec incorporated in the cellular chipset/component 40. It is to be understood that any suitable encoding or modulation technique that provides an acceptable data rate and bit error may be used with the examples disclosed herein. Generally, dual mode antenna 50 services the location detection chipset/component 44 and the cellular chipset/component 40.

The microphone 28 provides the user with a means for inputting verbal or other auditory commands, and can be equipped with an embedded voice processing unit utilizing human/machine interface (HMI) technology known in the art. Conversely, speaker 30 provides verbal output to the vehicle occupants and can be either a stand-alone speaker specifically dedicated for use with the telematics unit 14 or can be part of a vehicle audio component 60. In either event and as previously mentioned, microphone 28 and speaker 30 enable vehicle hardware 26 and call center 24 to communicate with the occupants through audible speech. The vehicle hardware 26 also includes one or more buttons, knobs, switches, keyboards, and/or controls 32 for enabling a vehicle occupant to activate or engage one or more of the vehicle hardware components. In one example, one of the buttons 32 may be an electronic pushbutton used to initiate voice communication with the call center 24 (whether it be a live advisor 62 or an automated call response system 62'). In another example, one of the buttons 32 may be used to initiate emergency services.

The audio component 60 is operatively connected to the vehicle bus 34 and the audio bus 58. The audio component 60 receives analog information, rendering it as sound, via the audio bus 58. Digital information is received via the vehicle bus 34. The audio component 60 provides AM and FM radio, satellite radio, CD, DVD, multimedia and other like functionality independent of the infotainment center 56. Audio component 60 may contain a speaker system, or may utilize speaker 30 via arbitration on vehicle bus 34 and/or audio bus 58.

Still referring to FIG. 1, the vehicle crash and/or collision detection sensor interface 52 is/are operatively connected to the vehicle bus 34. The crash sensors 54 provide information to the telematics unit 14 via the crash and/or collision detection sensor interface 52 regarding the severity of a vehicle collision, such as the angle of impact and the amount of force sustained.

Other vehicle sensors 64, connected to various sensor interface modules 66 are operatively connected to the vehicle bus 34. Example vehicle sensors 64 include, but are not limited to, gyroscopes, accelerometers, magnetometers, emission detection and/or control sensors, environmental detection sensors, and/or the like. One or more of the sensors 64 enumerated above may be used to obtain vehicle data for use by the telematics unit 14 or the call center 24 (when transmitted thereto from the telematics unit 14) to determine the operation of the vehicle 12. Non-limiting examples of sensor interface modules 66 include powertrain control, climate control, body control, and/or the like.

In a non-limiting example, the vehicle hardware 26 includes a display 80, which may be operatively directly connected to or in communication with the telematics unit 14, or may be part of the audio component 60. Non-limiting examples of the display 80 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like.

The electronic memory 38 of the telematics unit 14 may be configured to store data associated with the various systems of the vehicle, vehicle operations, vehicle user preferences and/or personal information, and the like. In an example, the electronic memory 38 is further configured to store an MDN when the telematics unit 14 is activated, and the inactive dialing number (i.e., the dummy number) when the telematics unit 14 is deactivated.

A portion of the carrier/communication system 16 may be a cellular telephone system or any other suitable wireless system that transmits signals between the vehicle hardware 26 and land network 22. According to an example, the wireless portion of the carrier/communication system 16 includes one or more cell towers 18, base stations 19 and/or mobile switching centers (MSCs) 20, as well as any other networking components required to connect the wireless portion of the system 16 with land network 22. The wireless portion of the carrier/communication system 16 further includes other supporting systems, including short message centers (SMSCs), which are systems specifically designed to send, deliver, and/or transmit short message service (SMS) messages to a desired destination (e.g., a particular cellular phone or other mobile communications device). The SMSCs also manage the queuing of messages. Such centers are not part of the actual radio link/channels, but rather are part of the core network systems of the cellular service provider 90. The sending, delivering, and/or transmitting of the SMS messages to the cellular service/network provider 90 may be accomplished using short message peer-to-peer (SMPP) protocol (i.e., a protocol for exchanging SMS messages between SMS peer entities, which use SMSCs for delivery of the SMS messages to a particular mobile communications device).

It is to be understood that various cell tower/base station/MSC arrangements are possible and could be used with the wireless portion of the system 16. For example, a base station 19 and a cell tower 18 may be co-located at the same site or they could be remotely located, and a single base station 19 may be coupled to various cell towers 18 or various base stations 19 could be coupled with a single MSC 20. A speech codec or vocoder may also be incorporated in one or more of the base stations 19, but depending on the particular architecture of the wireless network 16, it could be incorporated within an MSC 20 or some other network components as well.

Land network 22 may be a conventional land-based telecommunications network that is connected to one or more landline telephones and connects the wireless portion of the carrier/communication network 16 to the call/data center 24. For example, land network 22 may include a public switched telephone network (PSTN) and/or an Internet protocol (IP) network. It is to be understood that one or more segments of the land network 22 may be implemented in the form of a standard wired network, a fiber or other optical network, a cable network, other wireless networks such as wireless local networks (WLANs) or networks providing broadband wireless access (BWA), or any combination thereof.

Call center 24 is designed to provide the vehicle hardware 26 with a number of different system back-end functions. For example, the call center 24 may be configured to receive a request to reactivate a particular then-currently deactivated telematics unit 14. Upon receiving the request, the call center 24 is further configured to submit another request to a cellular service provider 90 to generate a message including at least a reactivation protocol for the particular telematics unit 14. Such message is ultimately broadcasted to a plurality of telematics units/mobile units, including the telematics unit/mobile unit 14, over a data messaging channel. Further details of the method will be described below in conjunction with FIG. 2.

According to the example shown in FIG. 1, the call center 24 generally includes one or more switches 68, servers 70, databases 72, live and/or automated advisors 62, 62', processing equipment (or processor) 84, a communications module 86, as well as a variety of other telecommunication and computer equipment 74 that is known to those skilled in the art. These various call center components are coupled to one another via a network connection or bus 76, such as one similar to the vehicle bus 34 previously described in connection with the vehicle hardware 26.

The processor 84, which is often used in conjunction with the computer equipment 74, is generally equipped with suitable software and/or programs enabling the processor 84 to accomplish a variety of call center 24 functions. More particularly, the various operations of the call center 24 are carried out by one or more computers (e.g., computer equipment 74) programmed to carry out at least some of the tasks of the method(s) disclosed herein. The computer equipment 74 (including computers) may include a network of servers (including server 70) coupled to both locally stored and remote databases (e.g., database 72) of any information processed.

In an example, the processor 84 is configured to run at least some of the computer programs and/or software for performing one or more steps of the method that are performed at the call center 24. For example, the processor 84 may include computer readable code for recognizing a telematics unit 14 reactivation request, and computer readable code for instructing the communications module 86 to submit a request to the cellular service/network provider 90. Such request may be submitted to the network provider 90 via real-time web service (using, e.g., B2B connectivity), via a batch system (e.g., sending a file transfer protocol (FTP) at predefined times of the day), via an in-house web or another application using a GUI interface supported by the web service (e.g., a call center advisor 62 desktop application), or via a web GUI interface provided directly by the network provider 90. Any of the foregoing methods may be supported by standard protocols such as SMPP, or by a custom interface with the service provider 90. In an example, the request includes an instruction to broadcast a message including a reactivation protocol to the telematics units, including unit 14, by the cellular service/network provider 90 via the data messaging channel.

In an example, the communications module 86 includes suitable communications equipment that enables the call center 24 to establish a communication with the cellular service/network provider 90, or visa versa. Such equipment may, for instance, be capable of handling voice calls, packet data sessions, or other messaging-based communications between the call center 24 and the cellular service/network provider 90 (e.g., via a circuit-switch network), messaging (e.g., via VehComm), modems, TCP/IP supporting equipment, and/or the like.

Switch 68, which may be a private branch exchange (PBX) switch, routes incoming signals so that voice transmissions are usually sent to either the live advisor 62 or the automated response system 62', and data transmissions are passed on to a modem or other piece of equipment (not shown) for demodulation and further signal processing. The modem preferably includes an encoder, as previously explained, and can be connected to various devices such as the server 70 and database 72.

It is to be appreciated that the call center 24 may be any central or remote facility, manned or unmanned, mobile or fixed, to or from which it is desirable to exchange voice and data communications. As such, the live advisor 62 may be physically present at the call center 24 or may be located remote from the call center 24 while communicating therethrough.

The cellular service/network provider 90 generally owns and/or operates the carrier/communication system 16. It is to be understood that, although the cellular service/network provider 90 may be located at the call center 24, the call center 24 is a separate and distinct entity from the cellular service/network provider 90. In an example, the cellular service/network provider 90 is located remote from the call center 24 (as shown in FIG. 1). The cellular service/network provider provides the user with telephone and/or Internet services, while the call center 24 is a telematics service provider. The cellular service/network provider 90 is generally a wireless carrier (such as, for example, VERIZON WIRELESS®, AT&T®, SPRINT®, etc.). It is to be understood that the cellular service/network provider 90 may interact with the call center 24 to provide various service(s) to the user.

In an example, the cellular service/network provider 90 includes its own processing equipment (not shown) configured to run suitable software programs enabling the processing equipment to accomplish a variety of cellular service/network provider 90 functions. In an example, one of the software programs run by the processing equipment includes computer readable code for broadcasting the message to subscriber vehicles 12, 12', 12" in a predefined geographic region. Such software programs and equipment may be embodied as a short message center operated by the cellular service/network provider 90.

Further, the data messaging channel is a channel capable of broadcasting transmissions to shared/common numbers in deactivated mobile communications devices. The data messaging channel is part of, or in selective and operative communication with, the cellular service/network provider 90, and such channel is configured to broadcast messages (e.g., data messages such as SMS messages) and/or services to the telematics unit 14. As used herein, the term "broadcasting" refers to the process of transmitting a message over airwaves to a plurality of receivers (e.g., the broadcast receiver 98 that is operatively connected to the telematics unit 14). In an example, the generated message is broadcasted in the form of radio signals (e.g., traveling through one or more cellular towers 18 of the carrier/communication system 16), which are transmitted to a predefined geographic region within which the targeted telematics unit 14 is then-currently located.

The mobile communications devices, including telematics unit 14, each include a receiver 98, configured with appropriate software routines, which monitor the data messaging channel when the device is in the deactivated state. All deactivated mobile communications devices (e.g., telematics unit 14) monitoring the channel will recognize messages sent over such channel, and will receive the contents of such messages. In some instances, a message is transmitted over the channel in a predefined geographic region, and all of the deactivated mobile devices monitoring the channel in the predefined geographic region will receive the content of the message. However, as described further hereinbelow, the targeted telematics unit/mobile communications device 14 alone will be able to process the message and take action in response thereto.

While not shown in FIG. 1, it is to be understood that in some instances, the call center 24 is a data center that receives voice or data calls, analyzes the request associated with the voice or data call, and transfers the call to an application specific call center. It is to be understood that the application specific call center may include all of the components of the call center 24, but is a dedicated facility for addressing specific requests, needs, etc. Examples of such application specific call centers are emergency services call centers, navigation route call centers, in-vehicle function call centers, or the like.

Examples of the method of reactivating a then-currently deactivated telematics unit 14 will now be described in detail in conjunction with FIG. 2. In an example, the method includes submitting a request to the call center 24 to reactivate the then-currently deactivated telematics unit 14 (shown by reference numeral 200). Submission of the request may be accomplished by the user, a person acting on behalf of or representing the user (e.g., a salesman at a dealership), a person with authorization to make the request (e.g., a friend of the user whom the user has indicated, e.g., in his/her user profile stored at the call center 24 has authorization to make such a request), or the like.

In an example, the request may be submitted by placing a voice call with the call center 24 using, e.g., a cellular phone, a landline phone, or some other like communications device (except for the telematics unit 14, which is then-currently deactivated). Upon receiving the call, the call is routed, by the switch 68 at the call center 24, to an appropriate division of the call center (e.g., a division that specifically handles and/or addresses activation and reactivation requests and/or processes). In instances where the call center 24 is a data center, the call is received at the data center 24, and the switch 68 at the data center 24 directs the call to an appropriate service specific call center (in this case, a call center specifically designed for activation/reactivation of the telematics unit 14). Upon establishing a connection with the appropriate division at the call center 24 (or with the appropriate application specific call center if a data center 24 initially receives the call), a verbal request to reactivate the telematics unit 14 may be recited to one of the advisors 62, 62'. Such request may be entered into the advisor's 62, 62' workstation, and eventually used by the processor 86 at the call center 24 to initiate reactivation of the telematics unit 14. In an example, if a human advisor 62 is servicing the call, the advisor 62 may select (via a mouse click or the like) a reactivation command icon or menu choice integrated in his/her desktop application. Upon making this selection, a broadcast request is automatically sent to the carrier system 16 via web service including any necessary information pertaining to the vehicle 12 (such as, e.g., geographic information, personal identification information, or the like). In an example, such information may be retrieved from a user profile stored at the call center 24. In another example, such information may be determined from the geographic coordinates of the address from which the call was made (such as, e.g., the dealership from which a salesperson initiates the call).

In another example, submission of the request may be accomplished by accessing and submitting the request via a webpage (such as the remotely accessible page 96) that is run or operated by, or otherwise associated with the telematics service provider (which includes the call center 24 as part of its overall system) or the network provider 90. Such a webpage 96 would be a customer/user accessible page that allows him/her to enter the request for reactivation to the call center 24 via the web. The webpage 96 may be accessed via web direct access or through a third party web having access to the webpage 96 using, e.g., a user's personal computer (e.g., the computer 100 shown in FIG. 2), where such computer has web access capabilities. More specifically, upon connecting with the webpage 96, the user may access the webpage by entering an appropriate login and password if a user account is already set up, or may set up his/her own user account if the user has not already done so. Once the user has accessed the webpage 96, the user may select an icon or a particular menu choice presented on the webpage 96 which is/are specifically designed, e.g., for submitting call center service requests.

Submission of the request includes speaking or entering, for example, a specific request to reactivate the then-currently deactivated telematics unit 14, information identifying the deactivated device, and information pertaining to the user's account and location. In some instances, the user may also input, with his/her request, payment information. The information identifying the deactivated device generally includes an alphanumeric expression that uniquely identifies the deactivated device such as, e.g., a device ID number, model number, or the like. In some cases, the information identifying the deactivated device includes vehicle information, such as the VIN number of the vehicle 12 within which the deactivated telematics unit 14 is disposed. The identification information of the deactivated device is referred to herein as a "mobile unit identifier". After the user has entered his/her request and the mobile unit identifier, the request is submitted by selecting (via a mouse click or the like), for example, a "Submit", "Done", or other similar icon displayed on the webpage 96. It is to be understood that when the webpage 96 is used to submit the request, the information regarding the identity of the deactivated device need not be manually entered by the user when he/she is logged into his/her previously set up account. Such information is stored in the account/profile and can be retrieved by the webpage 96 (running an appropriate software routine) in response to a command initiated by the user. For example, the webpage 96 may include prompts for the user to create a reactivation request, retrieve identifying information from his/her stored profile, and then submit the request once the appropriate fields of the request are populated with entered and/or stored information. Still further, when the reactivation request is made via a voice call, it is to be understood that the advisor 62, 62' assisting the user may access the user's profile (if one exists) to identify the vehicle information (e.g., VIN number) and associated telematics unit 14 information in order to determine the deactivated telematics unit's identifying information.

A series of events leading up to the reactivation of the deactivated unit 14 is initiated once the user (or a person or entity representing the user) has submitted the reactivation request. Briefly, once the initial reactivation request is submitted, either a data message is generated and sent out for broadcast, or a request to have a data message generated and broadcasted is sent out. It is to be understood that the reactivation method described hereinbelow is accomplished, for the most part, without any further involvement at least on behalf of the user or the user's representative after the user has submitted the request. For example, in instances where the user request is submitted via the webpage 96, another request (either including the message or including instructions for generating the message) may be automatically submitted from the call center 24 to the network provider 90 via the web service. In another example where the user request is submitted in a voice call to the call center 24, after such call is made, another request (either including the message or including instructions for generating the message) may be sent from the call center 24 to the network provider 90 via a voice call from a call center advisor 62 to an advisor at the network provider 90, or via a processor 84 transmitting such request to a processor at the network provider 90. An advisor at the network provider 90, for example, may enter such request into his/her desktop at the network provider 90, and such request may automatically trigger the generation of a data message to be broadcasted. In other instances, the call center advisor 62 may enter the user's request into his/her workstation (including the data message), and this will be sent to the network provider 90 via the web service. In these examples, substantially all of the efforts to reactivate the deactivated telematics unit 14 are accomplished by one or more systems at the call center 24, one or more systems at the cellular service provider 90, and the telematics unit 14. Such examples are further described hereinbelow.

Upon receiving the user's reactivation request, the method further includes submitting a request to the cellular service/network provider 90 from the call center 24 (as shown by reference numeral 202 in FIG. 2), where such request includes at least a request for the cellular service/network provider 90 to broadcast a reactivation message to the shared/common mobile dialing number stored in the deactivated telematics unit 14. In an example, the request submitted to the cellular service/network provider 90 from the call center 24 may be accomplished using a wired data connection (e.g., via the web service, as a batch process, or the like). In another example, the request submitted to the network provider 90 may be accomplished using a dedicated line, a virtual private network (VPN), or via another secure data connection.

The reactivation message may, for example, be generated at the call center 24, and such message may be transmitted (e.g., via the web service, using SMPP, or the like) to the cellular service/network provider 90 along with the request to broadcast the message. In this example, the reactivation message is generated via suitable software programs operated by the processor 84 at the call center 24. Such messages may be binary messages that include an extra flag indicating that the message is a broadcast message (i.e., to distinguish the message from routine messages that are sent to a single unit). Such messages may also include relevant geographic data (in a predefined format such as latitude/longitude, zip code no. 1, zip code no. 2, zip code no. 3, SID no. 1, SID no. 2, etc.) indicating the region in which the message is to be broadcast. When the reactivation message is generated at the call center 24, generally the cellular service/network provider 90 simply needs to broadcast the message to the desired area upon receiving such message.

In another example, upon receiving the user request to reactivate the telematics unit 14, the call center 24 submits a request to the cellular service/network provider 90 to i) generate a reactivation message, and then ii) broadcast the message to the shared/common mobile dialing number stored in the deactivated telematics unit 14. In some instances, the reactivation message is generated via suitable software programs operated by computer equipment or processors of the network provider 90. This type of request (submitted to the network provider 90 from the call center 24) includes instructions regarding how to generate the message (i.e., type of format to be used), and/or what to include in the message (i.e., the telematics unit's identifying information) and/or, where to broadcast the message (e.g., geographic data). This type of request (not including the actual data message, but rather instructions for generating and broadcasting such a message) may be transmitted to the network provider 90 in instances where the call center 24 has established a custom interface with the network provider 90 computer system.

The reactivation message is generally configured to enable the deactivated telematics unit 14 to recognize i) the message as a reactivation command, and ii) that the intended recipient of the message is that particular deactivated device 14. Further, the reactivation message is designed so that the telematics unit 14 can actually receive the message even though the telematics unit 14 is deactivated at the time the message is sent. This may be accomplished by designing the reactivation message as a data message such as one supported by push technology or specific control channel messaging, short message service messaging which utilize the SMSC described herein (i.e., a binary text format SMS message). It is to be understood that the reactivation message may be designed as a data message other than an SMS message so long as the transmission of such message is supported by the wireless cellular provider.

In an example, the data message sent to the telematics unit 14 (via the broadcast) includes or has embedded therein i) the mobile unit identifier that is recognizable by the processor 36 associated with the telematics unit 14 upon receiving the message, and ii) a protocol for reactivating the mobile unit (i.e., the telematics unit 14) identified by the mobile unit identifier. The data message further includes, in an example, the active MDN to be extracted and stored in the telematics unit 14, geographic information (e.g., latitude and longitude coordinates of the proximate then-current location of the telematics unit 14), the actual message, and the type of transmission for which the message should be sent from the cellular service/network provider 90 to the telematics unit 14 (e.g., via broadcasting). All of this information may be sent in binary form, such that all of the desirable information is stored within the binary encoded payload (which, in an example, may include 160 7-bit bytes to 140 8-bit bytes).

The protocol for reactivating the device (also referred to herein as the "reactivation protocol") is a procedure that may be performed by a processor 36 associated with the deactivated device 14 to actually reactivate the device 14. In some cases, the reactivation protocol also includes i) a procedure that the device 14 may perform to initiate registration of the device 14 with the cellular service/network provider 90 once the device 14 has been reactivated, and/or ii) instructions for initiating a voice connection (e.g., circuit-switched connection), a data connection (e.g., a packet data connection), or a message-based connection (e.g., via SMS messaging) with the call center 24 for purposes of notifying the call center 24 that the device has been reactivation, to configure the device for, e.g., particular services, or the like. In an example, the reactivation protocol further includes instructions for reactivating the telematics unit 14 for a prescribed period of time (which may have been indicated in the user's reactivation request). For instance, the reactivation protocol may include a command that is executable by the processor 36 of the device 14 that automatically deactivates the device 14 when the user's subscription expires (e.g., after 1 month, 6 months, 2 years, etc.). In another example, the reactivation protocol includes instructions for reactivating the device 14 for a single telematics service (such as, e.g., a door unlock).

As indicated above, the reactivation message is sent to the deactivated telematics unit 14 in a manner sufficient for the deactivated device 14 to receive the message. Such is accomplished, for example, by broadcasting the data message over a predefined geographic region within which the deactivated telematics unit 14 is then-currently located (as shown by reference numeral 204 in FIG. 2). The predefined geographic region, for example, is defined by a region within a radius of an actual or suspected then-current location of the deactivated telematics unit 14. The actual or suspected then-current location of the device 14 may be determined via any suitable means that does not directly involve a connection directly with the deactivated device 14. In one example, the request submitted by the user identifies the then-current location of the vehicle 12 and device 14. In this example, the location information may be provided by the user or retrieved from the user's profile based upon other information provided by the user (e.g., a prompt to retrieve the garage address, a work address, etc.). For instance, in addition to the request and the mobile unit identifier, a description of the then-current location of the device (e.g., the address where the vehicle 12 is currently parked, a believed zip code, state, or other geographic information of the vehicle 12, or the like) is included in the reactivation request.

It is to be understood that some delay time may exist between the time the location of the vehicle 12 is initially received and the time at which the message is actually broadcast. In some cases, the delay time may be such that the vehicle 12 has actually traveled outside of the geographic region within which the message is sent. As such, the geographic region may be broadened and the message re-broadcasted. Such re-broadcasting will be described in further detail below.

In another example, the initial user request does not identify the location, but the suspected location of the deactivated device 14 may be obtained from the user's profile (e.g., the garage address of the vehicle 12, a zip code associated with the garage address, or coordinate (e.g., latitude or longitude) data of a known address or point of interest. In still another example, the initial user request does not identify the location, but the suspected location of the deactivated device 14 may be obtained from driving habits stored in the user's profile. For example, if the user has a pattern of driving to and from work at 7 am and 5 pm, respectively, on Monday through Friday, the processor(s) 84 at the call center 24 can deduce that the vehicle 12 is located at the driver's office when a reactivation request is received at 8 am on Tuesday. When the call center 24 is deducing the vehicle's location (i.e., the actual location is not received with the user's request), an advisor 62, 62' at the call center 24 may, in some instances, contact the user associated with the vehicle 12 to verify the vehicle's then-current location.

Once the vehicle 12 location is identified, the call center 24 submits such actual (e.g., real time) or suspected location information to the cellular service/network provider 90 when submitting the request to generate the data message. In instances where the user's address is used, via the processor at the cellular service/network provider 90, the geographic region may be defined using a radius to create a boundary surrounding the given address. Any desirable radius may be used, and that the radius selected depends, at least in part, on the type of geographic region within with the address is located. For instance, if the address is located in a heavily populated city (e.g., Chicago), then the radius may be defined as being 10 miles, 20 miles, or the like. If, however, the address is located in a rural area, then the radius may be defined as being 50 miles, 100 miles, or the like.

In instances where the zip code is used to determine the geographic boundary for the broadcasted message, the geographic region may be defined by at least all of the area covered by the particular zip code. In some cases, the geographic region may also include areas surrounding the area assigned to the zip code (e.g., a distance of 20 miles beyond the peripheral edges of the zip code area). Such cases may include those where the call center 24 has reason to believe that the vehicle 12 with the deactivated device 14 travels outside of the zip code area on a daily basis (e.g., if the vehicle 12 within which the deactivated telematics unit 14 travels outside of the zip code commuting back and forth to a place of business, or the vehicle 12 is part of a fleet which routinely travels, etc.). Such information may be retrieved from an operation history of the vehicle 12 that may also be stored in the user profile at the call center 24.

Figure 2:
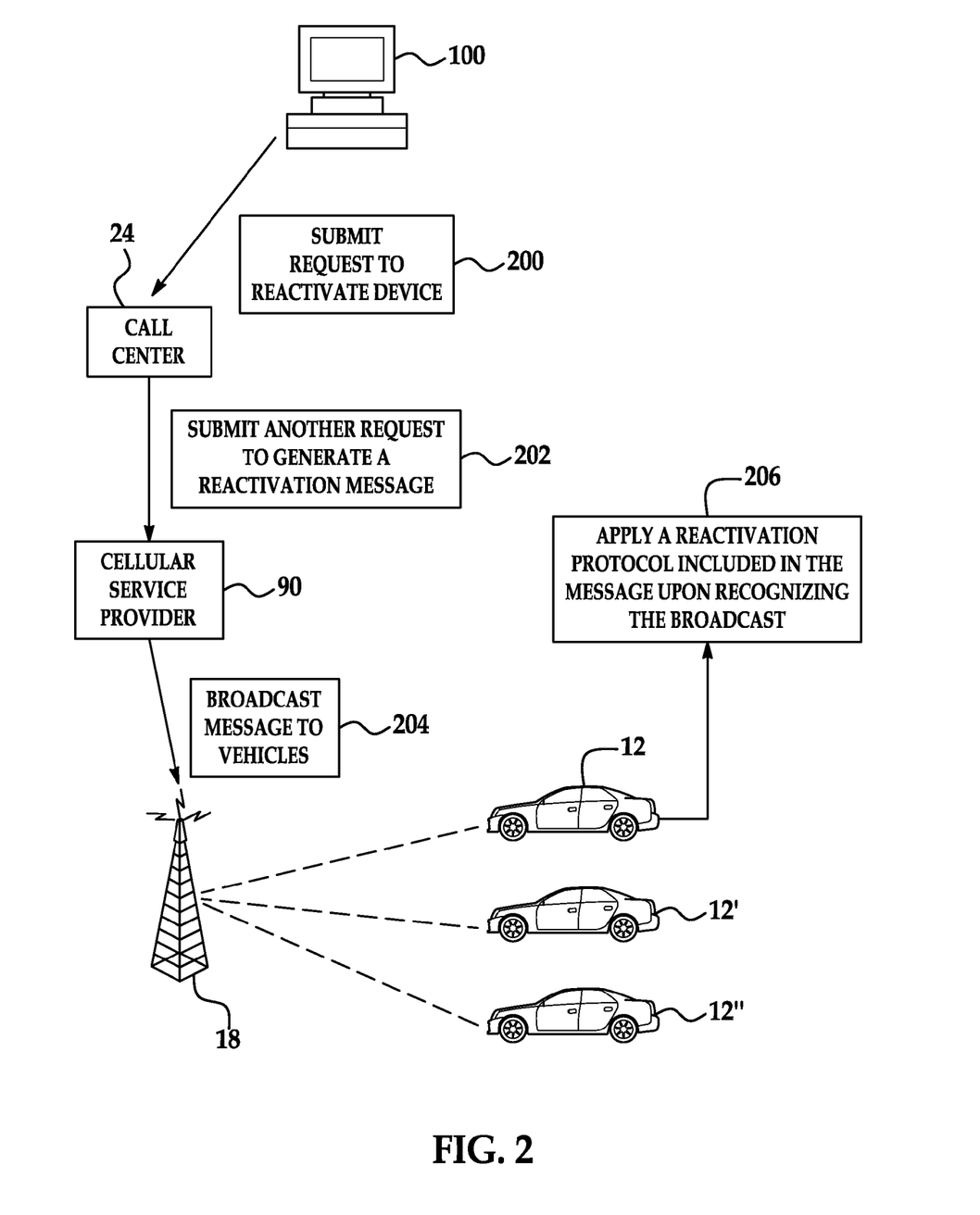
FIG. 2 is a flow diagram depicting an example of a method for reactivating a then-currently deactivated mobile unit.

The data message may be broadcasted to a plurality of vehicles (e.g., the vehicles 12, 12', 12") then-currently located within the predefined geographic region (as also shown by reference numeral 204 in FIG. 2). In one example, the plurality of vehicles 12, 12', 12" includes all of the subscriber vehicles having a telematics unit 14 then-currently programmed with a shared/common number (i.e., inactive dialing number, "dummy" number) that are then-currently located in the predefined geographic region. In another example, the plurality of vehicles 12, 12', 12" that receive the broadcast message is part of a targeted group of vehicles such as, e.g., all of the vehicles having a deactivated telematics unit that are then-currently located in the predefined geographic region. In this case, the broadcast message is sent to the dummy number, which is then-currently the active number due to the inactive state of the telematics units 14. Since the deactivated units are programmed to scan the broadcast channel and the inactive dialing number is the same for each of the deactivated telematics units 14 in the geographic region, all of the then-currently deactivated telematics units 14 within the geographic region will receive the broadcast message while the active units within the same geographic region will not receive the broadcast message (since the inactive dialing number is not active in such active units). Such is true, at least in part, because those units then-currently having an active MDN may be communicated with directly using the active MDN, instead of using a shared/common MDN.

In yet another example, the data message is broadcasted to all or a targeted group of vehicles 12, 12', 12" that are then-currently located within a network footprint of the cellular service/network provider 90. The network footprint may include, for example, a comprehensive coverage such as all of the cell towers nationwide. The network footprint may otherwise be restricted, such as, for example, to include all of the cellular towers connected to one of the mobile switching centers (MSCs) 20 of the carrier/communication system 16.

The data message is then broadcasted to the plurality of vehicles 12, 12', 12" in the selected geographic region, and all of these vehicles 12, 12', 12" are capable of receiving the contents of the broadcasted data message. It is to be understood, however, the broadcasted message is intended to be processed only by the deactivated telematics unit 14 whose mobile unit identifier matches the mobile unit identifier included in the message. It is to be understood that broadcasting of the data message may be accomplished a single time in instances where the targeted telematics unit 14 recognizes the message during the first broadcast. In some cases, the broadcasting of the message is accomplished for a predetermined period of time until the telematics unit 14 recognizes the message. If, however, the telematics unit 14 does not recognize the message during this time, a parameter associated with the broadcasting may be adjusted to target, e.g., a different geographical region, and the message may be re-broadcasted. The parameter associated with the broadcasting may, e.g., be the location of the then-currently deactivated device 14. For instance, the cellular service/network provider 90 may query the call center 24 for additional information stored in the user profile pertaining, e.g., to other potential addresses that the user may be associated with. The cellular service/network provider 90 may use such other addresses to construct another geographic region within which the message may be broadcasted. In some cases, upon being notified by the call center 24 that the targeted telematics unit 14 has not yet responded to the broadcasted message, the network provider 90 may automatically determine, via programs run by the computer equipment, a wider geographic region during a next/subsequent attempt of the broadcast. Such a wider geographic region may be determined by estimating a radius around the vehicle's 12 original suspected location, where such radius is larger than that used during the first broadcast attempt. In one example, the wider/larger geographic region may otherwise include the region covering the entire city or zip code within which the vehicle 12 is then-currently suspected to be located in. If such region(s) is/are still too small after one or more additional attempts at a successful broadcast, then an even larger area or region may be tried (such as, for example, the entire state, region of the country, or even the entire country).

In another example, the message may be broadcast following further instruction from the call center 24 and according to multiple pieces of geographic data included in the original broadcast request submitted to the network provider 90 from the call center 24. In this example, any subsequently broadcast messages follow the progression of the geographic data included in the call center's original request. As briefly mentioned above, such subsequent broadcasts are sent after the call center 24 informs the network provider 90 that the targeted telematics unit 14 has not responded to the broadcasted message. The network provider 90 may not be capable of recognizing the telematics unit's receipt of the message, and thus may rely upon further instructions from the call center 24 prior to attempting rebroadcasts.

It is further to be understood that re-broadcasting of the message may be accomplished a number of times until such the message is recognized or the broadcasting network channel times out. Such may occur automatically by systems of the cellular service/network provider 90 using information provided in the original broadcast request submitted to the network provider 90 from the call center 24, or in response to follow up requests submitted by the call center 24 at certain times and/or intervals.

Among all of the vehicles 12, 12', 12" receiving the broadcasted message, the then-currently deactivated telematics unit 14 alone is configured to process the contents of the message upon recognizing the mobile unit identifier included in the broadcasted message. In an example, the deactivated telematics units, via a processor associated therewith, monitor the service channel(s) (e.g., the data messaging channel) used by the cellular service/network provider 90 for transmission of data messages. In one example, the deactivated telematics unit 14 monitors a control channel for an incoming message, and upon receiving the message, processes the message to determine if such message is a valid message for the receiving unit. In a non-limiting example, the control channel is a service channel specifically configured for transmitting reactivation or other service-type messages. It is to be understood, however, that the control channel may be any channel used by the cellular service/network provider 90 to transmit data messages to the vehicles 12, 12', 12". A valid message may include one that recites the unique mobile unit identifier of the telematics unit 14 and a reactivation command. In an example, the processor 36 associated with the telematics unit 14 includes suitable computer programs configured to recognize that the mobile unit identifier included in a data message received over the service channel matches that of the device 14 with which the processor 36 is associated. Those units recognizing that the mobile unit identifier contained in the message does not match simply disregard the message, as they are not configured to act on a message with a non-matching identifier. It is to be understood that the deactivated telematics units are capable of performing such monitoring because the devices are still operable and capable of performing certain functions although such devices 14 cannot receive incoming calls. It is further to be understood that although all of the devices, including device 14, are capable of recognizing the data message as a reactivation message and can receive contents of the message, only the targeted device (i.e., the telematics unit 14 in this case) can actually process the contents of the message due to the match of the identification number.

As stated above, the data message includes the mobile unit identifier and a reactivation protocol. In one example, the data message is a text-based message including the mobile unit identifier included a header field of the message. In some cases, the header field may also include information that identifies the data message as being a reactivation command, and such information is recognizable by the telematics unit 14 as such. In an example, the header may include a line of text including a command to reactivate the device followed by the mobile unit identifier. For instance, the header may recite, "REACTIVATE DEVICE NO. 123456", where the mobile unit identifier is "DEVICE NO. 123456", and the reactivation command is the word "REACTIVATE".

In another example, and to reiterate from above, the data message may be a binary message that includes the unique mobile unit identifier in binary code. An example of such binary data message resembles 0010011010, or some other similar binary code.

In another example, the data message also has embodied therein a protocol for the reactivating of the device 14. Such protocol may include software commands that are executable by the processor 36 associated with the telematics unit 14 for reactivating the device. In an example, upon recognizing the header of the message as being a reactivation command for the device 14, the processor 36 automatically reviews the data message for the reactivation protocol. The protocol for the reactivating of the device 14 may be extracted, via suitable software programs executable by the processor 36, from the data message by the processor 36 upon recognizing i) that the mobile unit identifier contained in the message matches that of the telematics unit 14, and ii) the word or the binary code representing the word "REACTIVATE" as a trigger to reactivate the device.

Once the reactivation protocol has been extracted from the data message (as a result of recognizing at least the mobile unit identifier included therein), the protocol may be applied, by the processor 36, to initiate reactivation of the deactivated telematics unit 14. In an example, the telematics unit 14 extracts the active MDN, and then initiates a communication session with the call center 24 to complete reactivation of the device. In another example, the protocol is applied by automatically placing a call to the call center 24 from the still deactivated telematics unit 14, where such call includes a reactivation request. Such call may be a circuit-switch data call or a packet data call made using a cleared number. During the call, either made by the telematics unit 14 or by the call center 24, the call center 24 submits to the telematics unit 14 a procedure for reactivating the unit 14. This procedure includes, for example, specific instructions for setting up the telematics unit 14 so that the telematics unit 14 is placed into an active state. For instance, the reactivation procedure may include submitting, to the telematics unit 14, an active mobile dialing number (MDN) (in instances where an active MDN was not included in the broadcasted data message) and/or instructions pertaining, e.g., to storing the MDN in the telematics unit 14 and using the stored MDN to place calls. In some cases, the reactivation procedure further includes specific services, telematics unit settings, and/or authentication information such as a login/password for transmitting packet data or the like. Once the reactivation procedure is complete, the telematics unit 14 is rendered active, and is capable of receiving future incoming calls until such device 14 is deactivated again. Such may occur, e.g., upon expiration or cancellation of the subscription agreement between the user and the call center 24. Furthermore, upon reactivating or during the reactivation of the device 14, the user may establish a new subscription agreement with the call center 24. The user's subscription may therefore commence as soon as the telematics unit 14 is in fact reactivated.

While several examples have been described in detail, it will be apparent to those skilled in the art that the disclosed examples may be modified. Therefore, the foregoing description is to be considered exemplary rather than limiting.

The invention claimed is:

1. A method for reactivating a then-currently deactivated mobile unit, comprising:
submitting a request to a call center to reactivate the then-currently deactivated mobile unit;
upon receiving the request, submitting an other request to a cellular service provider from the call center, the other request including a request to broadcast a message having contained therein a mobile unit identifier and a reactivation protocol;
broadcasting the message from the cellular service provider to a plurality of mobile units each having stored therein an identical inactive dialing number;
via a processor operatively associated with the then-currently deactivated mobile unit, recognizing the mobile unit identifier contained in the broadcasted message; and
upon recognizing the mobile unit identifier, via the processor associated with the then-currently deactivated mobile unit, applying the reactivation protocol contained in the broadcasted message to initiate reactivation of the then-currently deactivated mobile unit.

2. The method as defined in claim 1 wherein the broadcasted message is an SMS message.

3. The method as defined in claim 1 wherein the broadcasting is accomplished over a geographic region determined at least from a location of the then-currently deactivated mobile unit.

4. The method as defined in claim 3 wherein the location of the then-currently deactivated mobile unit is determined using at least one of an address of a user of the then-currently deactivated mobile unit, a zip code associated with the address of the user of the then-currently deactivated mobile unit, or coordinate data of a known address or point of interest.

5. The method as defined in claim 1 wherein the broadcasting is accomplished across a network footprint defined by the cellular service provider.

6. The method as defined in claim 1 wherein prior to the recognizing of the mobile unit identifier contained in the broadcasted message, the method further comprises monitoring, via the processor associated with the then-currently deactivated mobile unit, a service channel for the message, the service channel being used by the cellular service provider for broadcasting the message to the plurality of mobile units.

7. The method as defined in claim 1 wherein each of the plurality of mobile units is configured to receive contents of the broadcasted message; and wherein among all of the plurality of mobile units, the then-currently deactivated mobile unit alone is configured to process the contents of the broadcasted message when the processor of the then-currently deactivated mobile unit recognizes that a mobile unit identifier of the then-currently deactivated mobile unit matches the mobile unit identifier contained in the broadcasted message.

8. The method as defined in claim 1 wherein the broadcasting is accomplished for a predetermined period of time, and wherein when the then-currently deactivated mobile unit does not recognize the mobile unit identifier contained in the broadcasted message within the predetermined period of time, the method further comprises:
adjusting, via a processor operatively associated with the cellular service center, a parameter associated with the broadcasting; and then
re-broadcasting the message from the cellular service provider to the plurality of mobile units.

9. The method as defined in claim 8 wherein the parameter is a location of the then-currently deactivated mobile unit.

10. The method as defined in claim 1 wherein the applying of the reactivation protocol by the then-currently deactivated mobile unit includes:
   automatically placing a call to the call center from the then-currently deactivated mobile unit, the call including a reactivation request; and
   following, via the processor associated with the then-currently deactivated mobile unit, a reactivation procedure provided by the call center.

11. The method as defined in claim 10 wherein the call is a circuit-switched data call or a packet data call.

12. The method as defined in claim 1 wherein prior to submitting the other request to the cellular service provider from the call center, the method further comprises generating the message using a processor at the call center; and wherein the other request includes the message in addition to the request to broadcast the message.

13. The method as defined in claim 1 wherein the other request includes a request to generate the message in addition to the request to broadcast the message.

14. A mobile unit reactivation system, comprising:
   a plurality of mobile units each having stored therein an identical inactive dialing number, one of the plurality of mobile units being a particular then-currently deactivated mobile unit;
   a call center configured to receive a request to reactivate the particular then-currently deactivated mobile unit;
   a cellular service provider in operative communication with the call center, the cellular service provider configured to receive an other request from the call center, the other request including a request to broadcast a message having contained therein a mobile unit identifier and a reactivation protocol;
   a data messaging channel operatively associated with the cellular service provider, the data messaging channel configured to broadcast the message from the cellular service provider to the plurality of mobile units; and
   a processor operatively associated with the particular then-currently deactivated mobile unit, the processor being configured to run computer readable code for:
      recognizing the mobile unit identifier contained in the broadcasted message; and
      applying the reactivation protocol contained in the broadcasted message to initiate reactivation of the particular then-currently deactivated mobile unit.

15. The system as defined in claim 14 wherein the broadcasted message is an SMS message.

16. The system as defined in claim 14 wherein the data messaging channel is further configured to broadcast the message across a network footprint defined by the cellular service provider.

17. The system as defined in claim 14 wherein the processor is further configured to run computer readable code for monitoring a service channel for the message, the service channel being configured to be used by the cellular service provider for broadcasting the message to the plurality of mobile units.

18. The system as defined in claim 14 wherein the processor of the particular then-currently deactivated mobile unit is further configured to run computer readable code for processing the contents of the broadcasted message upon recognizing that a mobile unit identifier of the then-currently deactivated mobile unit matches the mobile unit identifier contained in the broadcasted message.

19. The system as defined in claim 14 wherein the cellular service provider includes a processor configured to run computer readable code for adjusting a parameter associated with the broadcasted message when the then-currently deactivated mobile unit does not recognize the mobile unit identifier contained in the message, and wherein the data messaging channel is further configured to re-broadcast the message to the plurality of mobile units via a data channel supporting SMS messaging.

20. The system as defined in claim 14 wherein the then-currently deactivated mobile unit is further configured to automatically place a call to the call center, the call including a reactivation request, and wherein the processor associated with the then-currently deactivated mobile unit is further configured to follow a reactivation procedure provided by the call center.

* * * * *